United States Patent [19]

Usui et al.

[11] Patent Number: 4,964,658
[45] Date of Patent: Oct. 23, 1990

[54] SMALL-SIZE PIPING COUPLING JOINT

[75] Inventors: Masayoshi Usui, Numazu; Katsushi Washizu, Shizuoka; Kazunori Takikawa, Numazu, all of Japan

[73] Assignee: Usui Kokusai Sangyo Kaisha Ltd., Shizuoka, Japan

[21] Appl. No.: 387,491

[22] Filed: Jul. 28, 1989

[30] Foreign Application Priority Data

Jul. 29, 1988 [JP] Japan .................. 63-100870[U]
Jul. 29, 1988 [JP] Japan .................. 63-100869[U]
Aug. 12, 1988 [JP] Japan .................. 63-106798[U]

[51] Int. Cl.⁵ .................................... F16L 39/00
[52] U.S. Cl. .............................. 285/319; 285/921
[58] Field of Search ......................... 285/319, 921

[56] References Cited

U.S. PATENT DOCUMENTS

| 2,550,591 | 4/1951 | Parsons | 285/319 |
| 2,869,099 | 1/1959 | Robinson | 285/319 X |
| 4,660,803 | 4/1987 | Johnston et al. | 285/921 X |
| 4,730,856 | 3/1988 | Washizu | 285/319 |
| 4,776,616 | 10/1988 | Umehara et al. | 285/348 X |

FOREIGN PATENT DOCUMENTS 2548581 5/1977 Fed. Rep. of Germany ...... 285/319
2635871 2/1978 Fed. Rep. of Germany ...... 285/319

Primary Examiner—Randolph A. Reese
Assistant Examiner—Carol I. Bordas
Attorney, Agent, or Firm—Anthony J. Casella; Gerald E. Hespos

[57] ABSTRACT

A small-size piping coupling joint, comprising a retainer member with a piping insertion hole perforated in a shaft center portion of a bottom wall and a plurality of locking claw walls projecting uniformly as tapered toward a rear side provided on a peripheral side wall portion, and a socket member provided with a flow hole in the shaft center portion ranging to a stepped expanded portion inside of an end portion on a coupling side, and having an engaging groove on an outer circumferential wall portion. With an outward swelling wall having a seal ring on the back positioned within the stepped expanded portion, the retainer member and the socket member are locked overlapping each other to connection, thus the locking claw walls are locked resiliently in the engaging groove on the socket member side to coupling of the piping.

7 Claims, 4 Drawing Sheets

SMALL-SIZE PIPING COUPLING JOINT

BACKGROUND OF THE INVENTION

1. Field of the Invention

The present invention relates to a structural improvement of a coupling joint for relatively small-sized metallic and plastic tubes (hereinafter merely called "piping") 15 m/m or below in diameter or size which are arranged generally as passages for feeding oil and gas to automobiles, various kinds of machines, apparatuses and others.

2. Description of the Prior Art

As shown in FIG. 13, for example, a prior art small-size piping coupling joint of this kind comprises a joint body (21) wherein an expanded setting hole (22) consisting of a plural stepped portion and communicating with a flow hole of a connection tube wall (23) projecting ahead is perforated in a shaft center portion, and a plurality of locking holes (26) with a unified annular engaging wall (25) formed on an end circumferential wall side are perforated in a maximum-sized circumferential wall portion (24), and a tubular support member (27) wherein a back-stepped wall portion having an elastic claw wall (28) inward which engages with each locking hole (26) is stopped on the engaging wall (25) when connecting a piping (P$_1$) so as to engage with an annular swelling wall (P$_1'$) provided around a connecting end portion on a side of the piping (P$_1$) fitted close to a seal ring member inserted in a small-sized portion of the setting hole (22).

However, in such prior art, a structural complication is unavoidable from providing the elongated locking holes (26) in the circumferential wall portion (24) on a side of the joint body (21) and also the longitudinal engaging wall (25) on its end peripheral edge portion, further providing the tubular support member (27) having the elastic claw wall (28) stoppable separately at an opening on the engaging wall side, the joint must have the size longitudinal of the shaft center enlarged as a product, therefore a disadvantage is inevitable so often for use in a limited space for installation or at a portion where a complicated bend is necessary, further since the elastic claw wall (28) is engaged with the annular swelling wall (P$_1'$) within the joint body (21), whether or not the coupled state is proper cannot be ensured externally, and mud, dust and dirt and other foreign matters are capable of accumulating in the expanded setting hole (22).

SUMMARY OF THE INVENTION

The invention has been done in view of the aforementioned problems inherent in the prior art, and its object is to provide a coupling joint simple in structure, compact in the form of product particularly short in the direction of shaft center, ready for use in a limited space for installation at a portion where a complicated bend is necessary, further ready for ensuring visually whether or not the coupled state is proper, and capable of preventing mud, dust and dirt and other foreign matters from accumulating in the setting hole.

A first embodiment of the invention purports a small-size piping coupling joint, comprising a retainer member consisting of a bottomed cylinder with a piping insertion hole perforated in a shaft center portion of a bottom wall, and a plurality of locking claw walls projecting uniformly as tapered toward a rear inside provided on a peripheral side wall portion, and a socket member provided with a flow hole in the shaft center portion ranging to a stepped expanded portion inside of an end portion on a coupling side, and having an engaging groove on an outer circumferential wall portion, wherein at the time of piping coupling, with the insertion hole of the retainer member inserted around a coupled end portion of the piping and an outward annular swelling wall provided on the coupled end portion side and having a seal ring set on the back positioned within the stepped expanded portion, the locking claw walls are locked resiliently in a relative direction in the engaging groove on the socket member side.

Then, a second embodiment of the invention purports a small-size piping coupling joint, comprising a retainer member consisting of a bottomed cylinder with a piping insertion hole perforated in a shaft center portion of a bottom wall, and a plurality of locking claw walls projecting uniformly as tapered toward a rear inside provided on a peripheral side wall portion, and a socket member provided with a flow hole in the shaft center portion ranging to a stepped expanded portion inside of an end portion on a coupling side, and having an engaging groove on an outer circumferential wall portion, wherein at the time of piping coupling, an outward annular swelling wall provided around a coupled end portion of the piping is engaged with a bottom wall of the retainer member, an outer peripheral surface on a nose side of the piping is engaged with a bush and a seal ring inserted in the stepped expanded portion according as the retainer member is coupled to the socket member, the locking claw walls are locked resiliently in a relative direction in the engaging groove on the socket member side.

Further, a third embodiment of the invention purports a small-size piping coupling joint, wherein a stepped expanded chamber ranging to a flow hole of a coupling tube wall on a nose side is provided within a shaft center, a seal ring and a bush in the rear thereof are locked on a stepped portion and inserted in the expanded chamber, an insertion hole for piping to the shaft center is provided in a socket member with an engaging groove formed on the outer circumferential wall surface, further a retainer member consisting of a bottomed cylinder provided with a plurality of engaging holes on the peripheral side wall portion is fixed opposite thereto, and at the time of piping coupling, as held against the bush, an outward annular swelling wall portion provided around a coupled end portion on a side of the piping incorporated in the shaft center of a body by a bottom wall of the retainer member is laid overlapping on a circumferential wall around a nose of the retainer member by a cap member provided with a plurality of locking claw walls rearward, and as engaged with the engaging holes positioned opposite, each locking claw wall is locked resiliently to an engaging portion on the socket member side.

The invention comprises the above-described construction, which is realized according to a mutual locking state between the retainer member and the socket member coupled within the retainer member, and thus the structure is extremely simplified, the joint can be shortened in the direction of shaft center in the state where the piping is coupled to a compact product in form, accordingly the joint can be used in a limited space for installation and further at a portion where a complicated bend is necessary, the state where the locking claw walls are locked in the engaging groove can be ensured externally, and mud, dust and dirt and other foreign matters can be prevented from accumulating in the stepped expanded chamber by the retainer member and the socket member securely locked each other.

DETAILED DESCRIPTION OF PREFERRED EMBODIMENTS

Figure 1:
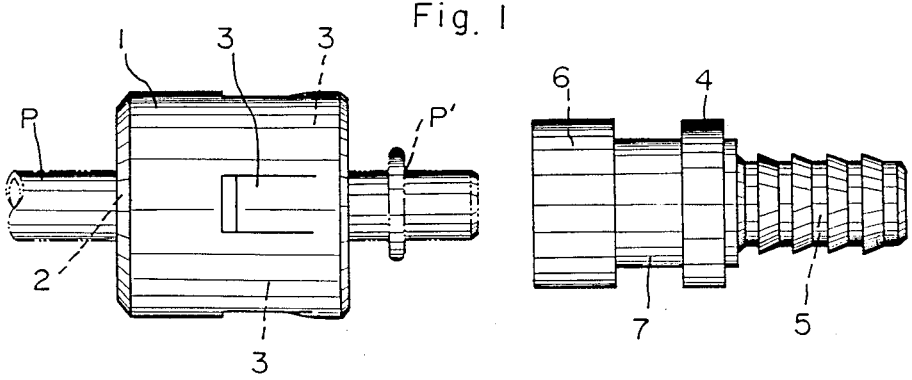
FIG. 1 is a plan view representing a state of a small-size piping coupling joint given in one embodiment of the invention before coupling.
Figure 2:
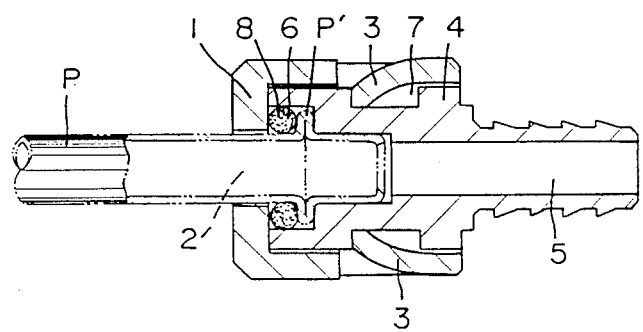
FIG. 2 is a longitudinal sectional view representing the coupling state of FIG. 1.

Like reference numerals denote like parts in the different views of FIG. 1 to FIG. 12.

Figure 7:
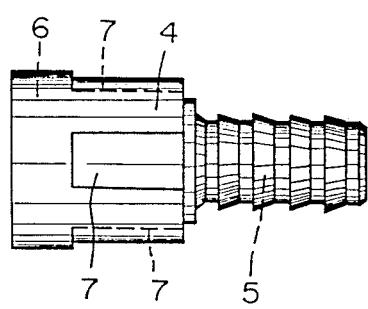
FIG. 7 is a plan view of a socket member stand-alone.
Figure 8:
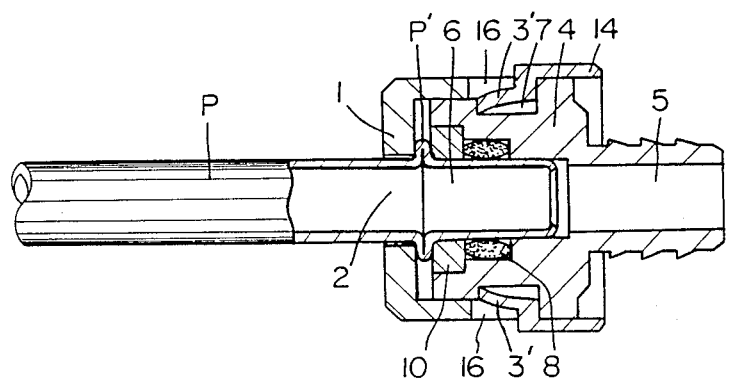
FIG. 8 is an illustration corresponding to FIG. 2, representing another embodiment.
Figure 9:
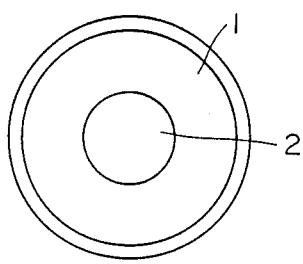
FIG. 9 is a front view of a retainer member relating to the embodiment of FIG. 8.
Figure 10:
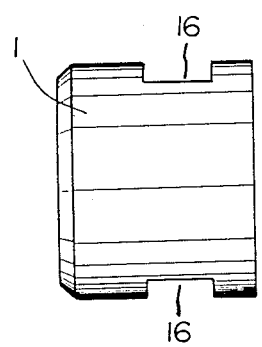
FIG. 10 is a plan view of FIG. 9.
Figure 11:
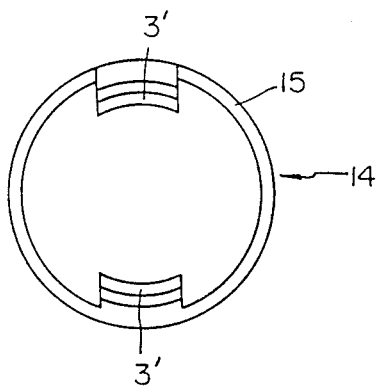
FIG. 11 is a front view of a cap member relating to the embodiment of FIG. 8.
Figure 12:
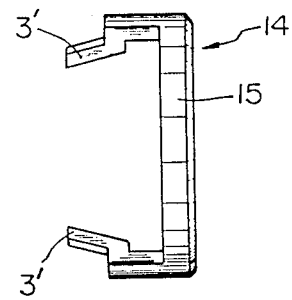
FIG. 12 is plan view of FIG. 11.
Figure 13:
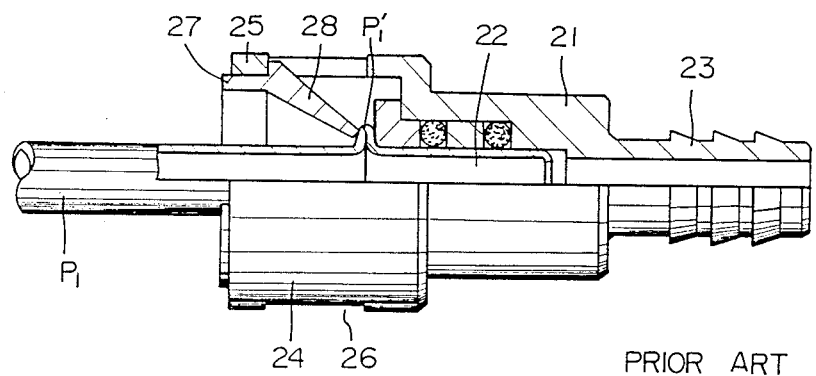
FIG. 13 is a sectional view, partly cutaway, representing a prior art coupling joint.

First, in FIG. 1 to FIG. 4, (1) denotes a retainer member, comprising a bottomed cylinder provided with an insertion hole (2) for piping (P) at a shaft center portion of the bottom wall, and also a plurality of locking claw walls (3) projecting uniformly as tapered toward a rear inside at the circumferential wall portion. A reference numeral (4) denotes a socket member, wherein a flow hole (5) on a coupling tube wall side such as plastic tube, rubber hose or the like is provided at the shaft center portion ranging to a stepped expanded portion (6) provided inside an end portion on the coupling side, further an engaging groove (7) annular in the circumferential direction is provided on an outer circumferential wall portion (FIG. 1 and FIG. 2), or is provided more than one longitudinally at intervals in the circumferential direction (FIG. 7 as described hereinlater). Then, for coupling the piping (P), a coupling end portion or around of the piping is inset in the insertion hole (2) on the side of retainer member (1), an outward annular swelling wall (P') with a seal ring (8) incorporated on the back provided on the coupling end portion side is positioned within the stepped expanded portion (6), and according as the retainer member is thus connected to the socket member (4), each locking claw wall (3) is stopped resiliently in a relative direction in the engaging groove (7) on the socket member side.

Figure 3:
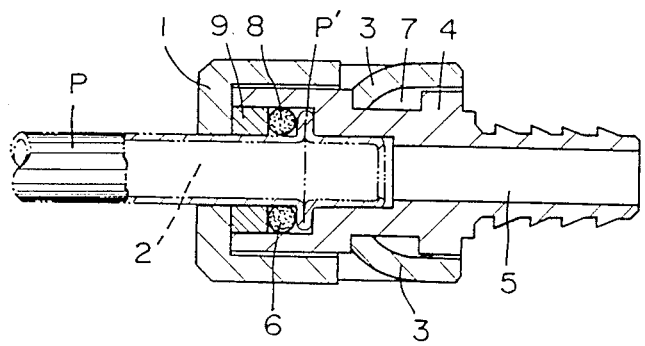
FIG. 3 and FIG. 4 are illustrations corresponding to FIG. 2, representing another embodiment each.
Figure 4:
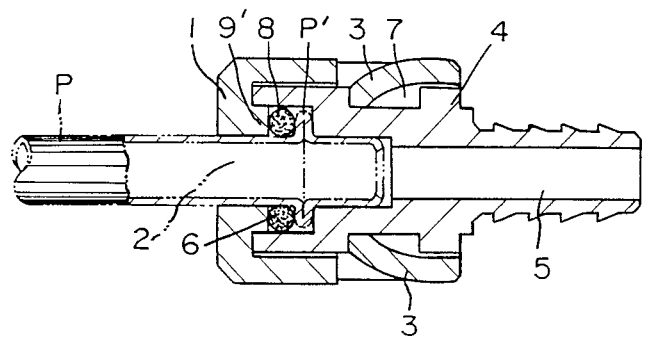

As illustrated in FIG. 3, a collar (9) may be interposed between a bottom wall of the retainer member (1) and the seal ring (8), or as shown in FIG. 4 otherwise, an annular salient wall (9') may be provided on the bottom wall of the retainer member (1), thereby allowing the salient wall (9') to come in contact with the seal ring (8).

Figure 5:
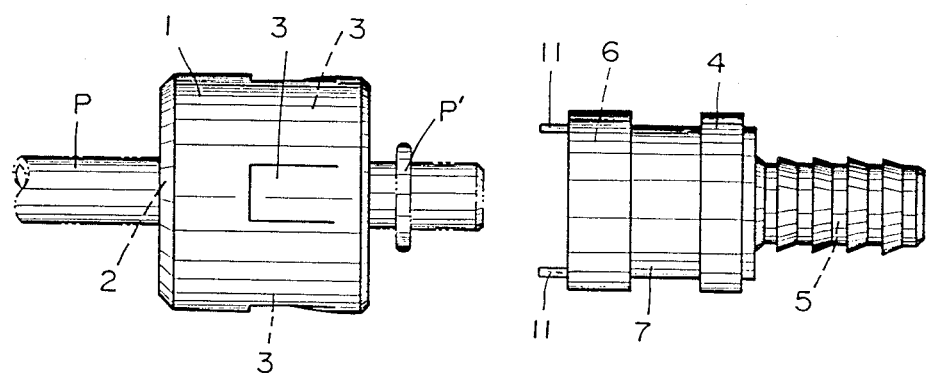
FIG. 5 is an illustration corresponding to FIG. 1, representing a further embodiment.
Figure 6:
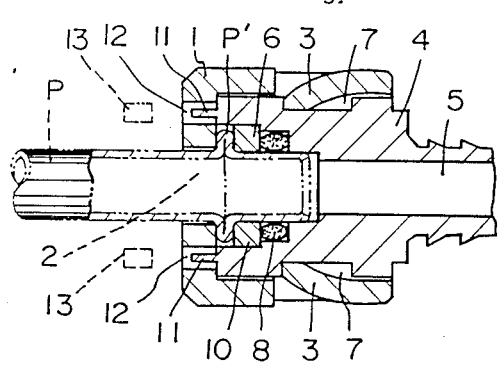
FIG. 6 is a longitudinal sectional view, partly cutaway, representing the coupling state of FIG. 5.

Next, an embodiment given in FIG. 5 to FIG. 7 comprises insetting the seal ring (8) of the above-described embodiment in the stepped expanded chamber (6) through a bush (10) instead of providing its position between the bottom wall of the retainer member (1) and the annular swelling wall (P').

That is, in the embodiment given in FIG. 5 to FIG. 7, the outward annular swelling wall (P') provided around the coupling end portion of the retainer member (1) through the insertion hole (2) thereof is engaged with a bottom wall of the retainer member (1), and a nose side outer peripheral surface of the piping (P) is engaged with the bush (10) and the seal ring (8) inset within the stepped expanded portion (6), then according as the retainer member is thus connected to the socket member (4), each locking claw wall (3) is stopped resiliently in a relative direction in the engaging groove (7) on the socket member side.

In FIG. 6, a reference numeral (11) denotes a pin member provided rearwards on a rear end circumferential wall surface of the socket member (4) as desired, which comes in contact with an assurance member (13) consisting of a plug fitted in a through hole (12) provided at a position opposite to a bottom wall portion of the retainer member (1) and pushes the assurance member (13) off the through hole (12), thereby ensuring that both are connected in order.

Further, in FIG. 8 to FIG. 12, a position of the seal ring (8) is kept similar to the embodiment of FIG. 5 to FIG. 7, a cap member (14) having locking claw walls (3') is provided separately without integrating the locking claw walls (3) with the retainer member (1), and an annular portion (15) of the cap member is locked on an opening end of the retainer member (1).

That is, in the embodiment given in FIG. 8 to FIG. 12, a plurality (2 pieces in the example illustrated therein) of engaging holes (16) are perforated in a circumferential wall portion of the retainer member (1) consisting of a bottomed cylinder, and at the time when the piping (P) is coupled, the annular swelling wall (P') is retained between a bottom wall of the retainer member (1) and the inset bush (10), the cap member (14) is fitted from an opening end side of the retainer member (1), and the locking claw walls (3') of the cap member (14) are locked resiliently in the engaging groove (7) through the engaging hole (16).

As described above, the small-size piping coupling joint according to the invention comprises a resilient locking structure by the locking claw walls (3) and the engaging groove (7) on the surface where the retainer member (1) and the socket member (4) are locked overlapping each other, therefore the structure is extremely simple, the joint can be shortened in the direction of shaft center where the piping (P) is coupled, a compact form is ready for use in a limited space for installation and particularly at a portion where a complicated bend is necessary, further a coupled state can visually be checked externally, and mud, dust and dirt and other foreign matters can be prevented from accumulating in the expanded chamber (6), thus serving usefully for the purpose.

What is claimed is:

1. A small-size pipe coupling joint comprising:
a cylindrical retainer member having an opened coupling end, an opposed bottom wall and a circumferential wall extending therebetween, the bottom wall having a pipe insertion hole passing centrally therethrough, the opened coupling end defining a socket receiving recess extending to the bottom wall, the circumferential wall being circumferentially continuous adjacent the coupling end of the retainer member but comprising at least one locking claw wall intermediate the ends and projecting slantingly into the socket receiving recess and toward the bottom wall;

a socket member having a rear end, a forward end and a flow hole extending therebetween, portions of said flow hole adjacent the forward end defining a stepped expanded chamber, the forward end being disposed in the socket receiving recess of the retainer member and adjacent the bottom wall thereof, an outer circumferential portion of said socket member being characterized by an engaging groove disposed in the socket receiving recess and being lockingly engaged by the claw wall for securely retaining the socket member in the socket receiving recess of the retainer member;

a pipe having a coupling end and an annular swelling wall, the pipe passing through the pipe insertion hole of the retainer member such that the annular swelling wall and the coupling end thereof are engaged intermediate the bottom wall of the retained member and the expanded chamber of the socket member; and seal means provided in the expanded chamber of the socket member and adjacent the annular swelling wall of the pipe, whereby the continuous circumferential wall portion of the retainer member adjacent the coupling end thereof prevents accumulation of foreign matter at the engagement of the claw wall with the opening groove of the socket member for ensuring secure retention of the pipe, the retainer member and the socket member in locked engagement with one another.

2. The joint as defined in claim 1, said locking claw all means comprising locking claw walls formed integrally with the retainer member.

3. The joint as defined in claim 1, wherein said seal ring is interposed between the annular swelling wall and the retainer member.

4. The joint as defined in claim 3, wherein a collar is interposed between the retainer member and the seal ring.

5. The joint as defined in claim 3, wherein an annular salient wall is provided on a bottom wall of the retainer member, the seal ring is interposed between the annular salient wall and the annular swelling wall.

6. The joint as defined in claim 1, wherein the seal ring is provided between the annular swelling wall and the shoulder through a bush.

7. The joint as defined in claim 1, wherein the engaging groove is provided annularly in a circumferential direction on an outer circumferential wall of the socket member.

* * * * *